United States Patent
Akolkar et al.

(10) Patent No.: US 9,363,154 B2
(45) Date of Patent: Jun. 7, 2016

(54) PREDICTION-BASED PROVISIONING PLANNING FOR CLOUD ENVIRONMENTS

(71) Applicant: International Business Machines Corporation, Armonk, NY (US)

(72) Inventors: Rahul P. Akolkar, Tuckahoe, NY (US); Arun Iyengar, Yorktown Heights, NY (US); Shicong Meng, Elmsford, NY (US); Isabelle Rouvellou, New York, NY (US); Ignacio Silva-Lepe, Putnam Valley, NY (US)

(73) Assignee: International Business Machines Corporaion, Armonk, NY (US)

( * ) Notice: Subject to any disclaimer, the term of this patent is extended or adjusted under 35 U.S.C. 154(b) by 757 days.

(21) Appl. No.: 13/627,672

(22) Filed: Sep. 26, 2012

(65) Prior Publication Data

US 2014/0089509 A1    Mar. 27, 2014

(51) Int. Cl.
*G06F 15/173* (2006.01)
*H04L 12/26* (2006.01)
*H04L 12/911* (2013.01)
(Continued)

(52) U.S. Cl.
CPC .............. *H04L 43/04* (2013.01); *G06F 9/5005* (2013.01); *H04L 41/147* (2013.01); *H04L 41/5096* (2013.01); *H04L 47/70* (2013.01); *H04L 47/823* (2013.01); *G06F 2209/5019* (2013.01); *H04L 47/822* (2013.01)

(58) Field of Classification Search
CPC ..... H04L 47/70; H04L 41/147; H04L 47/823; H04L 43/04; H04L 41/5096; H04L 47/822; G06F 9/5072

USPC ........................................ 709/223, 224, 226
See application file for complete search history.

(56) References Cited

U.S. PATENT DOCUMENTS

| | | | |
|---|---|---|---|
| 6,351,775 B1 * | 2/2002 | Yu ....................... | H04L 67/1008 370/237 |
| 7,783,747 B2 * | 8/2010 | Abernethy, Jr. ..... | H04L 67/1008 709/223 |
| 2002/0095434 A1 | 7/2002 | Lane | |

(Continued)

OTHER PUBLICATIONS

Non-Final Rejection dated May 8, 2015 received for U.S. Appl. No. 13/734,260.

(Continued)

*Primary Examiner* — Anthony Mejia
(74) *Attorney, Agent, or Firm* — Fleith Gibbons Gutman Bongini & Bianco PL; Thomas Grzesik

(57) ABSTRACT

Various embodiments predict performance of a system including a plurality of server tiers. In one embodiment, a first set of performance information is collected for a base allocation of computing resources across multiple server tiers in the plurality of sever tiers for a set of workloads. A set of experimental allocations of the computing resources is generated on a tier-by-tier basis. Each of the set of experimental allocations varies the computing resources allocated by the base allocation for a single server tier of the multiple server tiers. A second set of performance information associated with the single server tier for each of the set of experimental allocations is collected for a plurality of workloads. At least one performance characteristic of at least one candidate allocation of computing resources across the multiple server tiers is predicted for a given workload based on the first and second sets of performance information.

20 Claims, 10 Drawing Sheets

(51) Int. Cl.
*H04L 12/24* (2006.01)
*G06F 9/50* (2006.01)

(56) References Cited

U.S. PATENT DOCUMENTS

| | | | | |
|---|---|---|---|---|
| 2003/0233391 | A1* | 12/2003 | Crawford, Jr. | G06F 9/505 718/104 |
| 2005/0108714 | A1* | 5/2005 | Geye | G06F 9/5033 718/100 |
| 2006/0026179 | A1* | 2/2006 | Brown | G06F 17/30306 |
| 2007/0067296 | A1* | 3/2007 | Malloy | H04L 41/145 |
| 2007/0195700 | A1* | 8/2007 | Katoh | H04L 12/2602 370/235 |
| 2008/0049013 | A1* | 2/2008 | Nasle | G05B 23/0229 345/419 |
| 2008/0059972 | A1* | 3/2008 | Ding | G06F 9/505 718/105 |
| 2008/0115014 | A1* | 5/2008 | Vaidyanathan | G06F 11/008 714/42 |
| 2009/0178047 | A1* | 7/2009 | Astley | G06F 9/5038 718/104 |
| 2011/0016214 | A1* | 1/2011 | Jackson | G06F 9/5044 709/226 |
| 2011/0145795 | A1* | 6/2011 | Khanapurkar | G06F 11/3414 717/126 |
| 2011/0231899 | A1* | 9/2011 | Pulier | G06F 9/45558 726/1 |
| 2011/0295999 | A1* | 12/2011 | Ferris | G06F 9/5072 709/224 |
| 2011/0320391 | A1 | 12/2011 | Chen et al. | |
| 2012/0030154 | A1* | 2/2012 | Nicholson | G01S 7/003 706/12 |
| 2012/0047346 | A1* | 2/2012 | Kawaguchi | G06F 3/0605 711/165 |
| 2012/0185913 | A1* | 7/2012 | Martinez | G06F 9/455 726/1 |
| 2012/0233328 | A1* | 9/2012 | Iyoob | G06F 9/5061 709/226 |
| 2012/0246638 | A1* | 9/2012 | He et al. | 718/1 |
| 2012/0272237 | A1* | 10/2012 | Baron | G06F 9/45558 718/1 |
| 2012/0317249 | A1* | 12/2012 | Salsburg | G06F 9/5072 709/220 |
| 2012/0330971 | A1* | 12/2012 | Thomas | G06F 17/30663 707/748 |
| 2013/0042005 | A1* | 2/2013 | Boss | G06F 9/5011 709/226 |
| 2013/0111035 | A1* | 5/2013 | Alapati | G06F 9/5072 709/226 |
| 2013/0138419 | A1* | 5/2013 | Lopez | G06F 11/3058 703/21 |
| 2014/0089509 | A1* | 3/2014 | Akolkar et al. | 709/226 |
| 2014/0137104 | A1* | 5/2014 | Nelson et al. | 718/1 |
| 2014/0229610 | A1* | 8/2014 | Shen | H04L 67/1031 709/224 |

OTHER PUBLICATIONS

Stewart, C., et al., "Exploiting Nonstationarity for Performance Prediction," EuroSys, Mar. 21-23, 2007, pp. 1-14.

Urgaonkar, B., et al., "An Analytical Model for Multi-tier Internet Services and Its Applications," Proceedings of the ACM SIGMETRICS International Conference on Measurement and Modeling of Computer Systems, Jun. 2005, pp. 1-13. Volume 33, Issue 1.

Zheng, W., et al., "JustRunit: Experiment-Based Management of Virtualized Data Centers," Jun. 2007, pp. 1-16.

WIKIPEDIA., "Mutual Information," http://en.wikipedia.org/wiki/Mutual_information, Downloaded on Jul. 21, 2015, pp. 1-10.

\* cited by examiner

PREDICTION-BASED PROVISIONING PLANNING FOR CLOUD ENVIRONMENTS

BACKGROUND

The present invention generally relates to cloud computing environments, and more particularly relates to provisioning resources within a cloud computing environment.

In general, cloud computing refers to Internet-based computing where shared resources, software, and information are provided to users of computer systems and other electronic devices (e.g., mobile phones) on demand. Adoption of cloud computing has been aided by the widespread adoption of virtualization, which is the creation of a virtual (rather than actual) version of something, e.g., an operating system, a server, a storage device, network resources, etc. Cloud computing provides a consumption and delivery model for information technology (IT) services based on the Internet and involves over-the-Internet provisioning of dynamically scalable and usually virtualized resources.

Cloud computing is facilitated by ease-of-access to remote computing websites (via the Internet) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

BRIEF SUMMARY

In one embodiment, a method with an information processing system for predicting performance of a system comprising a plurality of server tiers is disclosed. The method comprises collecting a first set of performance information for a base allocation of computing resources across multiple server tiers in the plurality of sever tiers for a set of workloads. A set of experimental allocations of the computing resources is generated on a tier-by-tier basis. Each of the set of experimental allocations varies the computing resources allocated by the base allocation for a single server tier of the multiple server tiers. A second set of performance information associated with the single server tier for each of the set of experimental allocations is collected for a plurality of workloads. At least one performance characteristic of at least one candidate allocation of computing resources across the multiple server tiers is predicted for a given workload based on the first set of performance information and the second set of performance information.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Deploying a multi-tier web application to meet a certain performance goal with minimum virtual instance renting cost is often the goal of many Infrastructure-as-a-Service (IaaS) users. However, achieving this goal can be very difficult to achieve for several reasons. First, a typical IaaS environments offer a variety of virtual server instances with different performance capacities and rental rates. Such instances are often marked with a high level description of their hardware/software configuration (e.g. 1 or 2 virtual CPUs) which offers little information regarding their performance for a particular application.

Second, multi-tier web applications often leverage clusters at different tiers to offer features such as load balance, scalability, and fault tolerance. The configuration of clusters (e.g., the number of member nodes, how workloads are distributed among member nodes, etc.) has a direct impact on application performance. However, the relation between cluster configuration and performance is application-dependent, and often not clear to cloud users.

To meet a given performance goal, users often over-provision a multi-tier web application by renting high-end virtual server instances and employing large clusters. Over-provisioning introduces high instance renting cost, which can make cloud deployment a less desirable option compared with traditional deployment options. Unfortunately, manually experimenting with different provisioning plans is often impractical given the huge space of candidate provisioning plans.

Therefore, one or more embodiments of the present invention provide prediction-based provisioning planning. Prediction-based provisioning planning identifies the most cost-effective provisioning plan for a given performance goal by searching the space of candidate plans with performance prediction. One or more mechanisms are provided that efficiently learn performance traits of applications, virtual machines, and clusters to build models to predict the performance for an arbitrary provisioning plan. Historical performance monitoring data and data collected from a small set of automatic experiments are utilized to build a composite performance prediction model. This composite performance prediction module takes as input application workloads, types of virtual server instances, and cluster configuration, and outputs predicted performance.

Operating Environment

Figure 1:
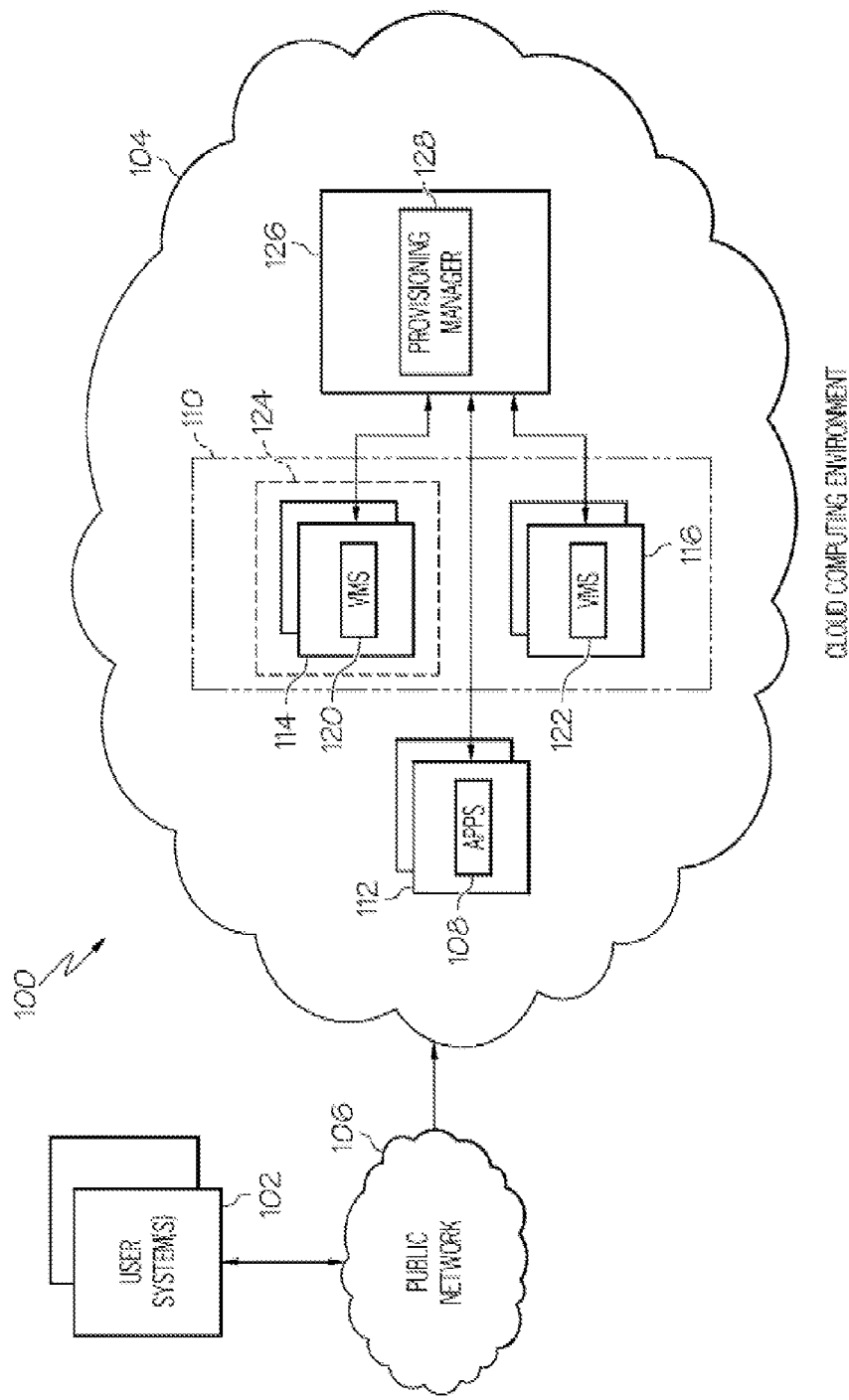
FIG. 1 is a block diagram illustrating one example of an operating environment according to one embodiment of the present invention.

FIG. 1 shows one example of an operating environment 100 for provisioning resources in a cloud computing environment for multi-tier cloud applications. It should be noted that although the following discussion is directed to a cloud computing environment various embodiment are not limited to such environment and are application to non-cloud computing environments as well. In particular, FIG. 1 shows one or more client/user systems 102 communicatively coupled to one or more cloud computing environments 104 via a public network 106 such as the Internet. The user systems 102 can include, for example, information processing systems such as desktop computers, laptop computers, servers, wireless devices (e.g., mobile phones, tablets, personal digital assistants, etc.), and the like.

The user systems 102 access the cloud computing environment 106 via one or more interfaces (not shown) such as a web browser, application, etc. to utilize resources provided by the environment 104. For example, FIG. 1 shows a plurality of resources such as applications 108 and computing resources 110 available within the cloud computing environment 104. Computing resources 110 include but are not limited to, processing, storage, networking, and other fundamental computing resources. Resources 108, 110 are provided by and/or are hosted on a plurality of physical information processing systems 112, 114, 116 and/or a plurality of virtual machines 118, 120 being executed by physical systems 114, 116. A plurality of physical systems 112, 114, 116, virtual machines 120, 122, or a combination thereof grouped together for providing a resource(s) is referred to as a "cluster" 124.

In one example, a cloud user (via a user system 102) utilizes the cloud environment 104 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier. Each of the web server, application server, and database server tiers can be comprised of one or more of the information processing systems 114, 116 and/or VMs 120, 122 in the cloud environment 104.

The cloud computing environment 104 further comprises one or more information processing systems 126 that comprise a provisioning manager 128. It should be noted that the information processing system 126 is not required to reside within the cloud environment 106. The provisioning manager 128 provisions resources in the cloud environment 106 to cloud users. In one embodiment, the provisioning manager 128 collects a first set of performance information for a base allocation of computing resources across multiple server tiers in the plurality of sever tiers for a set of workloads. The provisioning manager 128 also generates a set of experimental allocations of the computing resources is generated on a tier-by-tier basis. Each of the set of experimental allocations varies the computing resources allocated by the base allocation for a single server tier of the multiple server tiers. A second set of performance information associated with the single server tier for each of the set of experimental allocations is collected by the provisioning manager 128 for a plurality of workloads. At least one performance characteristic of at least one candidate allocation of computing resources across the multiple server tiers is predicted by the provisioning manager 128 for a given workload based on the first and second sets of performance information.

Figure 2:
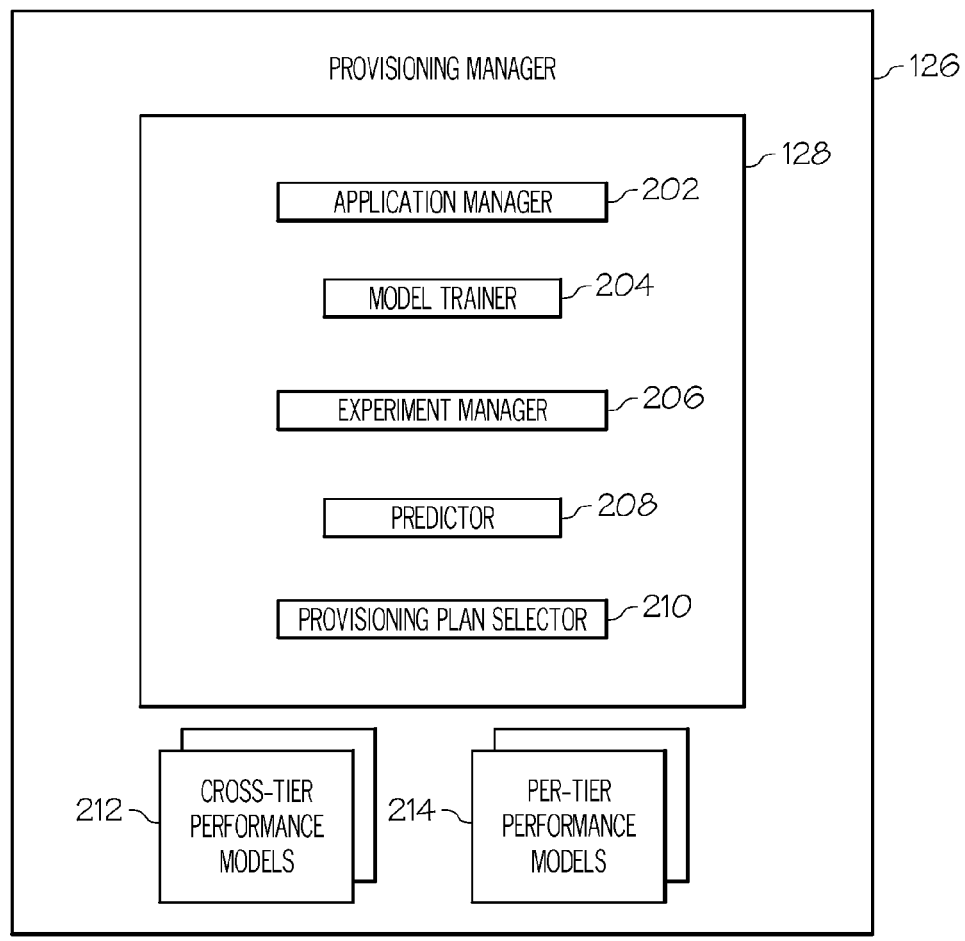
FIG. 2 is a block diagram illustrating a detailed view of a provisioning manager according to one embodiment of the present invention.

The provisioning manager 128, in one embodiment, comprises an application monitor 202, a model trainer 204, an experiment manager 206, a predictor 208, and a provisioning plan selector 210, as shown in FIG. 2. The application monitor 202 monitors and records application workloads and the corresponding performance. The model trainer 204 trains cross-tier performance models 212 based on the collected workloads and performance data. The model trainer 204 also trains per-tier performance models 214 based on workloads and performance data collected by the application monitor 202 during automatic experiments performed by the experiment manager 206. The experiment manager 206 replicates the multi-tier application, which was deployed for a cloud user, for a set of automatic experiments. These automatic experiments deploy the application with different provisioning plans and measure the corresponding performance with different workloads. The automatic experiments learn the performance characteristics of different deployment options (e.g., virtual machine types and the number of virtual machines in a cluster). The predictor 208 analyzes a plurality of candidate provisioning plans and predicts the corresponding performance (for the user specified workload range) using both the cross-tier and per-tier performance models 212, 214. The provisioning plan selector 210 selects the candidate provisioning plan that meets the user-specified performance goal and has the lowest virtual machine instance renting cost. This selected plan is utilized as the suggest deployment for the cloud user. The provisioning manager 128 and its components are discussed in greater detail below.

Predictive-Based Provisioning

The following is a more detailed discussion regarding the prediction-based provisioning planning performed by the provisioning manager 128. Throughout this discussion interactive cloud applications such as web applications are used as one example of the targeted applications. Such applications are request-driven and one request may be served by multiple components at different tiers (e.g., web servers, application servers and database servers). The performance goal/characteristic, such as (but not limited to) response time, requested by the cloud user is used to measure the performance of applications. Another performance goal/characteristic is request rate (throughput), which is used to measure the workloads on applications. It should be noted that other metrics can be utilized to measure the performance and workloads as well. The term "deployment" as used herein refers to the choice of virtual machine type and cluster configuration (the number of member nodes).

The provisioning manager 128, in one embodiment, identifies the most cost-effective provisioning plan for a given performance goal by searching the space of candidate plans with performance prediction. The provisioning manager 128 efficiently learns performance traits of applications 108, virtual machines 120, 122, and clusters 124 to build models 212, 214 for predicting the performance for an arbitrary provisioning plan. The provisioning manager 128 utilizes historical performance monitoring data and data collected from a small set of automatic experiments to build a composite performance prediction model. This performance prediction model that takes as input application workloads, types of virtual server instances, and cluster configuration and outputs predicted performance.

The provisioning manager 128 avoids exhaustively performing experiments on all candidate deployments to build a performance prediction model by using a two-step performance prediction procedure. For example, instead of directly predicting the performance of an arbitrary (target) deployment (also referred to here as "candidate allocation"), the provisioning manager 128 first predicts the performance on a known (base) deployment (also referred to herein as "base allocation") and then predicts the performance differences between the target deployment and the base deployment. The provisioning manager 128 combines the predicted base performance and the predicted performance changes to obtain the performance on the target deployment.

To achieve efficiency, the provisioning manager 128 predicts the performance change (delta) based on the deployment difference between the base deployment and the target deployment within each tier of the multi-tier application, rather than predict the overall performance changes holistically across multiple tiers. This avoids the need to exhaustively explore all deployments that represent combinations of deployment changes across tiers, since the provisioning manager 128 considers each tier independently. For example, suppose an application includes 3 tiers and each tier has 10 possible forms. An exhaustive search would explore all $10^3=1000$ deployments to train a traditional performance prediction model, while the provisioning manager 128 would only test 3*10=30 deployments to obtain the two-step performance prediction model. The provisioning manager 128 also applies a multiplicative-delta learning technique (in capturing performance changes introduced by different sizes of a tier) to further reduce the number of required experiments for model training. In addition, the provisioning manager 128 addresses cross-tier workload characteristics changes that violate the inter-tier independence of the performance model.

In one embodiment, the planning performed by the provisioning manager 128 comprises a prediction method(s), a capturing method(s), and a planning method(s). The prediction method takes workloads and deployment as input, and outputs the predicted application performance. The capturing method captures the changes of perceived workloads across different deployments. The planning method explores all candidate provisioning plans and outputs the optimal one.

With respect to prediction, the predictor 208 of the provision manager 128 predicts the response time for a given workload on an over-provisioned deployment (also referred to as the base deployment). The predictor 208 then modifies the predicted response time considering changes introduced by the difference between the over-provisioned deployment and the actual targeted deployment. Two performance models are utilized to accomplish this task: a cross-tier performance model 212 and a per-tier performance model 214. The cross-tier performance model 212 captures the relation between workload and response time for the base deployment. The per-tier performance model 214 captures the relation between deployment changes (to the base deployment) and corresponding changes of the response time.

A cross-tier model has the following form, $$\Theta_c(w) \rightarrow r \quad (1)$$

where w is the workload and r is the average response time of requests. The cross-tier model 212 takes workload (actual and/or observed at the various server tiers in the cloud) as input and outputs the response time on the base deployment. It should be noted that even though average response time is used to describe the techniques, one or more embodiment also support the prediction of quantile response time (e.g., 90th percent response time of requests). In one embodiment, the model trainer 204 trains the cross-tier model 212 using one or more training mechanisms. One example of a training mechanism is Kernel regression, which is a non-parametric technique that does not specify a certain relation (e.g., linear relation) between w and r, but produces a nonlinear relation between w and r that best fits the observed performance data. This flexibility is important as the actual relation between w and r may vary at different workload levels, or across different applications.

A per-tier model 214 has the form of, $$\Theta_p^t(w,v,c) \rightarrow r_\Delta \quad (2)$$

where t denotes the object tier, v is the virtual machine type, c is the cluster size, i.e. the number of member nodes, and $r_\Delta$ is the change of response time compared with the base deployment. The per-tier model 214 is a set of models where each model is trained for a particular tier. Each per-tier model takes the workload and the type and the number of virtual machine used at the object tier as input and outputs the changes of response time introduced by this tier over that of the base deployment. Similar to the cross-tier model 212, the pier-tier model 214 is trained by the model trainer 204 using one or more training mechanisms such as (but not limited to) Kernel regression.

To predict the response time for a target deployment and a given workload, the predictor 208 uses the per-tier model 214 to estimate the differences of response time introduced at each tier due to the deployment differences between the target deployment and the based deployment. Specifically, the overall change of response time change $R_\Delta$ is, $$R_\Delta \leftarrow \sum_{\forall t} \Theta_p^t(w, v(t), c(t)) \quad (3)$$

where v(t) is the virtual machine type in tier t and c(t) is the number of virtual machines in tier t. The final predicted response time r* is, $$r^* \leftarrow R_\Delta + \Theta_c(w) \quad (4)$$

where the predictor 208 applies the predicted response time changes to the predicted response time on the base deployment.

In one embodiment, the cross-tier model 212 and the per-tier model 214 are trained separately by the model trainer 204 in two steps. The model trainer 204 trains the cross-tier model 212 with performance monitoring data associated with the base deployment. This data can be collected from the base deployment when it serves user requests. Therefore, additional experiments are not required for data collection. In one embodiment, the training data set includes the request rates spanning from light workloads to peak workloads and the corresponding average response time. Various statistical tools can be used to train the cross-tier model 212. Typically, the base deployment is over-provisioned to ensure the request response time meets the performance goal. However, various embodiments are applicable to any base deployment. The base deployment is also used as a contrast to generate training data for the per-tier model 214.

The per-tier models 214 are trained in a tier-by-tier basis based on performance data collected on a series of automatic experiments performed by the experiment manager 206. For example, the experiment manager 206 creates a duplicate of the base deployment. This duplicate is referred to as the background deployment. For a per-tier model on tier t, the experiment manager 206 varies the configuration of tier t on the background deployment by changing the virtual machine type and the number of virtual machines. The experiment manager 206 leaves the configuration of other tiers unchanged (same as the configuration in the base deployment). This leads to mn different background deployments where m is the total number of virtual machine types and n is the maximum number of virtual machines in tier t. For each resulting background deployment (with virtual machine type v(t) and virtual machine number c(t) in tier t), the experiment manager 206 introduces different levels of workloads (from light level to peak level just as those in the cross-tier model training dataset) to the deployment. The experiment manager 206 records the differences in response time $r_A$ between the background deployment and the base deployment for each level of workload w. The workload, in one embodiment, is generated by workload generation tools. The resulting data points (w, v(t), c(t), $r_A$) are used to train the per-tier model $\Theta^t_p$. Similar to the cross-tier model 212, various statistical tools can be used to train the per-tier model 214.

One aspect of training the per-tier model 214 is capturing cluster performance changes with different number of virtual machines. The virtual machine provisioning time on most cloud platforms ranges from a few minutes to 20 minutes. As a result, adding virtual machines to a cluster one-by-one to capture the corresponding performance changes can take substantial time, especially for large clusters with many member nodes. To address this issue, one or more embodiments utilize a multiplicative-delta learning technique that selectively performs additional experiments. For example, instead of adding virtual machines one-by-one, the model trainer 204 doubles the virtual machines incremental number if the per-tier model gives good prediction on the performance of the current cluster. If the prediction accuracy drops at certain point, the model trainer 204 reduces the instance incremental number by half. The procedure finishes until the maximum instance number is reached. This technique is advantageous because most clusters implement a load-balance scheme among their member instances. As a result, the performance curve can be learned with relatively small amount of training data. Even if the cluster implements a complicated workload assignment scheme, the technique can degenerate to the original cluster performance learning procedure which intensively collects performance data points with many different size settings.

A detailed example will now be given illustrating one example of prediction-based provisioning planning in a cloud computing environment. In this example, a web application is deployed in a cloud environment such as International Business Machine's Smart Cloud Enterprise (SCE). SCE provides 9 different types of pre-configured virtual machine instances. The configuration is defined in terms of the number of virtual CPUs, the size of virtual machine memory and the size of local storage. Different types of VMs are also associated with different hourly (renting) rate.

In this example, a user wants to deploy a web application comprising of three tiers, the web server tier, the application server tier and a database tier. To deploy the web application, the user needs to decide the deployment plan for each tier. For example, the user needs to determine what types of VM instances to use at one tier and how many VM instances to use at one tier. In this example, it is assumed that one tier can at most utilize N=20 VM instances. In addition, the user also has a performance requirement of achieving an average request response time (measured in a 10-second time window) less than 2 seconds, as long as the incoming requests rate is below a certain level, e.g., 500 requests per second. The overall deployment goal, in this example, is to achieve this performance goal with minimum instance renting cost.

The provisioning manager 128 builds a performance model that produces accurate performance prediction for different deployments (versus a single-deployment prediction model). First, the model trainer 204 trains a regression-based performance model on an over-provisioned deployment referred to as the base deployment. In this example, such an over-provisioned deployment comprises Platinum virtual machines (64-bit VM with 16 virtual CPUs and 16 GB memory) and each tier has 20 such VMs. The training process includes feeding the base deployment with different levels of workloads and measuring the corresponding performance. The resulting performance data (average response time) and workloads are then used to train the performance model, which is a cross-tier model 212 that can predict the average response time for a certain workload on the base deployment.

The model trainer 204 also trains a set of models that captures the performance changes introduced by using different VM types and different number of VMs at each tier. This process is performed on a tier-by-tier basis with an outer loop and an inner loop. The outer loop deals with one tier at a time and the inner loop captures the performance changes brought by deployment changes at one tier. In one embodiment, the outer loop first selects the web server tier for manipulation. Within the corresponding inner loop, the experiment manager 206 changes the types of VMs from Platinum to 64-bit Gold (8 virtual CPUs and 16 GB memory) at the web server tier, and measures the difference between performance on the new deployment and also on the base deployment given different levels of workloads. The experiment manager 206 then reduces the number of VMs at the web server tier one-by-one, and measures the difference between performance on the resulting deployment and the base deployment. Note that the VM type and number is changed at the web server tier while the other two tiers (the application server tier and the database tier) are left unchanged (same as those in the base deployment).

Similarly, the VM type is then changed to 64-bit Silver (4 virtual CPUs and 8 GB memory) and the number of VMs is varied at the web server tier. For each resulting deployment, the experiment manager 206 measures the difference between performance on the new deployment and also on the base deployment given different levels of workloads. This process is repeated until all VM types have been tried on the web server tier. The collected performance difference data allows the model trainer 204 to train a web server tier model $\Theta_c(w) \rightarrow r$ that predicts the performance changes introduced by deployment changes (i.e., VM type and number) at the web server tier of the base deployment. At this point the first round of the outer loop finishes.

Figure 3:
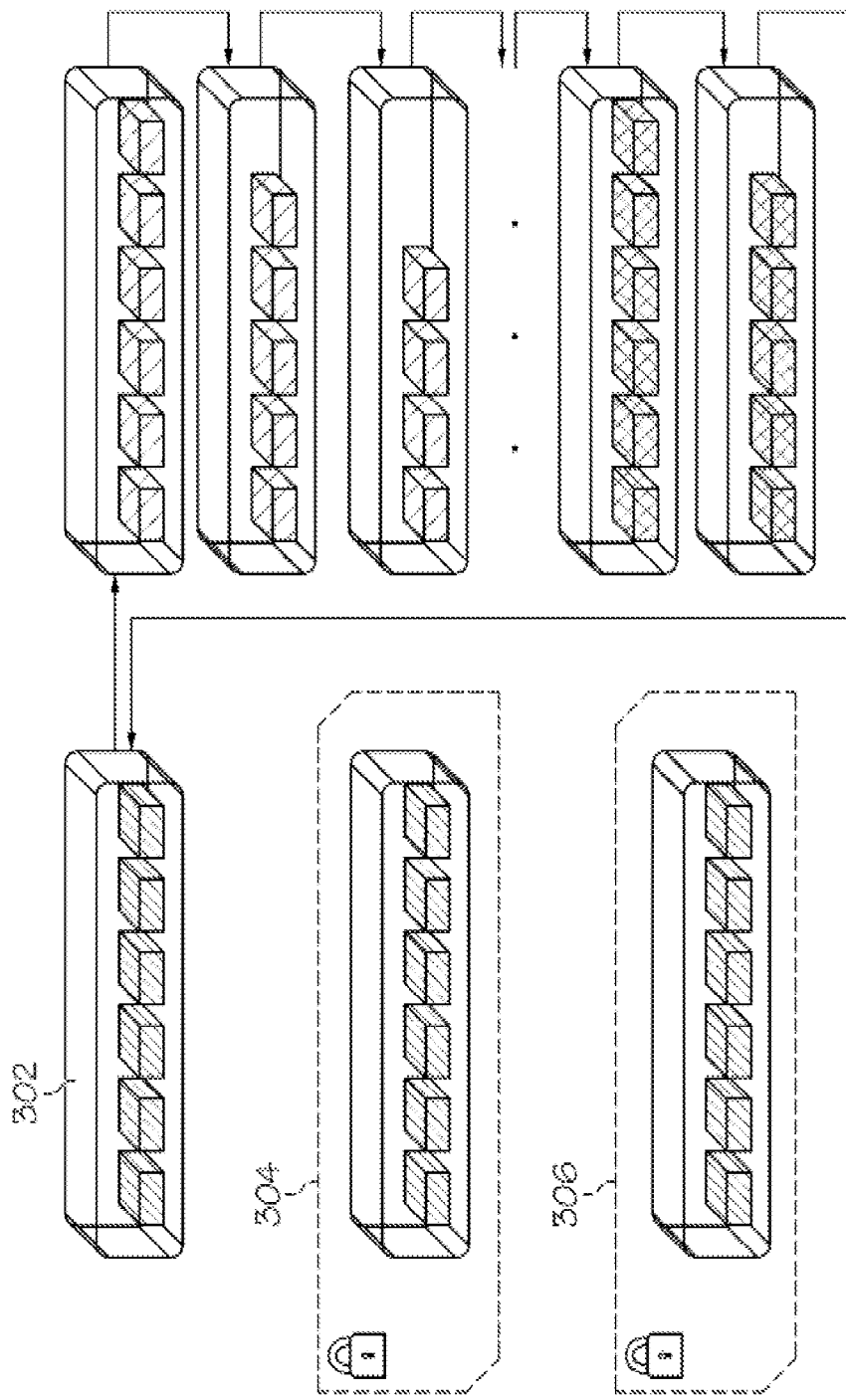
FIG. 3 shows one example of a per-tier model training process according to one embodiment of the present invention.

FIG. 3 illustrates the per-tier training process discussed above. In particular, for a specific tier 302, two nested loops are used to alter the type and the number of VMs running in the tier. In an outer loop, the type of VMs is changed to a different type in each round, as shown by boxes with different shading. In the inner loop, the number of VMs is changed to a different number in each round. The other tiers 304, 306 that are not currently used for per-tier training are kept the same as those in the base deployment. For each of the resulting configurations (with regards to VM type and number) the corresponding performance difference between the resulting deployment and the base deployment is measured. Note that the training process does not have to explore all VM types or VM numbers that are applicable to one tier as long as the training process provides sufficient data for the performance model. For instance, the inner loop can try 1, 2, 4, . . . , $2\hat{}n$, . . . , MAX instead of 1, 2, 3, . . . , MAX for the VM number during the training process where MAX is maximum number of VMs that may run in the tier.

Figure 4:
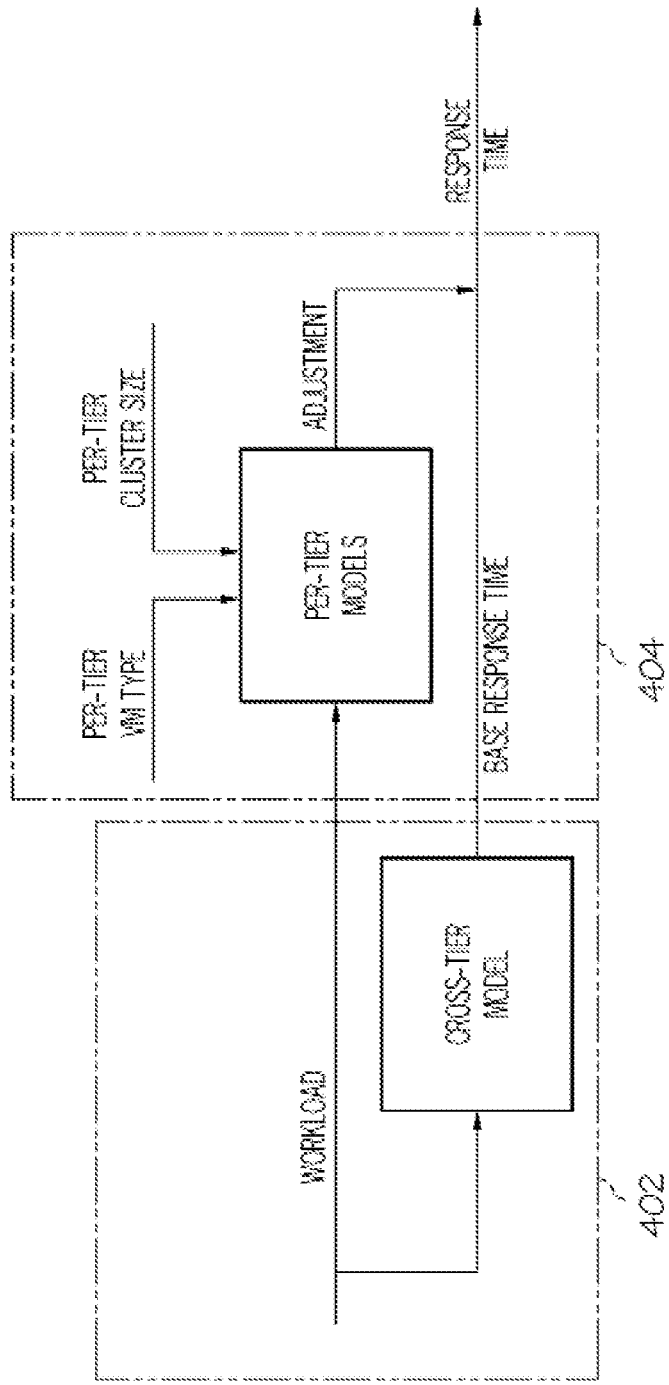
FIG. 4 shows an overall view of a prediction process for predicting the performance of a base deployment and target deployments according to one embodiment of the present invention.

The generated data leads to an application server tier model that predicts the performance changes introduced by deployment changes at the application server tier of the base deployment. Similarly, the final round works on the database tier and produces a database tier model that predicts the performance changes introduced by deployment changes at the application server tier of the base deployment. The resulting three trained models are referred to as per-tier models 214. The predictor 208 of the provisioning manager 128 utilizes the cross-tier performance model 212 generated based on the base deployment 402 and the per-tier performance models 214 generated based on the background deployments 216 to predict the performance of an arbitrary deployment, as shown in FIG. 4. For example, consider a scenario where the average response time is of interest for a deployment comprising 5 Bronze VMs (2 virtual CPUs and 4 GB memory) at the web server tier, 10 Silver VMs (4 virtual CPUs and 8 GB memory) at the application server tier, and 20 Gold VMs (8 virtual CPUs and 16 GB memory) at the database tier when given a workload of 500 requests per second. The predictor 208 uses the cross-tier model 212 to predict the average response time for the given workload (500 request/second). Note that the predicted response time (e.g., the base response time) is for the base deployment.

Next, the predictor 208 applies the web server tier model (a per-tier model 214) to predict the changes of response time contributed by the deployment changes at the web server tier (compared with that of the base deployment). As 5 Bronze VMs have much less processing power compared with 20 Platinum VMs in the base deployment, the predicted response time change is very likely to be a positive value. Similarly, the predictor 208 applies the application server tier model and the database tier model to obtain the predicted response time changes at the corresponding tiers. Finally, the predictor 208 sums up the base response time and the three predicted response time changes at different tiers together to obtain the predicted response time for the given deployment.

The above example makes an implicit assumption that the actual workloads perceived at each tier do not change across different deployments. This assumption, however, may not hold for many cloud applications. The perceived workload at a tier may not be the same as the workload introduced to the application due to prioritization, rate limiting mechanisms implemented at different tiers. For instance, an application may drop certain low-priority requests when a certain tier becomes performance bottleneck, which in turn causes the change of workload at other tiers. Even for applications without prioritization mechanisms a bottleneck tier may limit the overall system throughput and introduce changes to the workload on other tiers.

Performance prediction without considering such workload changes may lead to significant prediction accuracy loss. As another example, a database tier of a web application configured with a single low-end virtual machine can be a performance bottleneck when the web application is fed with a peak workload $w_p$. As a result, the actual workloads perceived at each tier w' is often less than $w_p$ as a certain amount of requests are queued due to database overloading. Using the data $(w_p, v, c, r_\Delta)$ for training can introduce error to the per-tier model 214. To address this issue, one or more embodiments also utilize a throughput model $\Theta^t_h$ for a tier t with the following form, $$\Theta^t_h(w,v,c) \rightarrow w' \qquad (5)$$

where w' is the actual workload perceived by all tiers. When making performance predictions the predictor 208 applies the throughput model to obtain the predicted workload at each tier, and use the lowest (e.g., smallest) predicted workload as the input of the per-tier model. Specifically, with the throughput model, the per-tier model has the following form, $$\Theta^t_p\left(\min_{\forall t}\Theta^t_h(w, v(t), c(t)), v, c\right) \rightarrow r_\Delta \qquad (6)$$

where the input workload w is replaced with the actual workload predicted by the throughput model. Various training mechanisms such as Kernel regression can be used to train the throughput model. Note that the data used for training the throughput model is (w, v, c, w') and w' can be measured by counting the number of responses within a time window.

In addition to the above, the provisioning manager 128 also supports request-mix awareness. For example, application workloads often comprise requests of different types. Requests of different types often introduce different processing overheads. For instance, bidding request in bidding applications usually incur higher costs than browsing requests do as bidding often involves database transactions. As a result, even if two workloads have the same request rate, they may result in very different resource consumption and performance if the composition of requests are very different (e.g., a 100 request/second workload with 20% bidding requests and 80% browsing requests versus another 100 request/second workload with 80% bidding requests and 20% browsing requests).

Performance oriented provisioning planning for application with heterogeneous per-request costs requires fine-grain definition of workloads with information on the composition of requests. Accordingly, the predictor 208 also considers the composition of requests, an aspect referred to herein as "request-mix awareness". To support request-mix-aware prediction, a set of new inputs is introduced, which describe the request composition of a workload. For example, the workload w (scalar) is replaced with a vector $R=r_1, r_2, \ldots, r_k$ where $r_i$ is the rate of requests of type i. For the brevity of discussion, the overall response time for all requests is predicted. Note that the various techniques discussed above can be directly used to predict the response time for a specific type, or a set of types, of requests by using the corresponding response time (of the specific type, or a set of type, of requests) to train models.

Training a model that is oblivious to request composition comprises generating workloads with different request rates, i.e., the model input (request rate) is a scalar. However, training a request-mix-aware model comprises much more performance measurement (training) data with different compositions of types of requests due to the extra degrees of freedom introduced by per-request-type workloads, i.e. the model input (per-type request rate) is a vector. This can significantly increase the experiment time and make the model training process expensive. For example, suppose there are 20 different types of requests and we measure request rates in 10 different levels (e.g., 0-100, 100-200, 200-300, etc.). An ideal set of training data would include all compositions of per-type request rates ($10^{20}$ different workloads), which is not practical. Note that even though the ideal set of data is not always needed to achieve reasonable prediction accuracy, (e.g., a 10% subset of the ideal training data (randomly selected) may be sufficient) a small percentage of such a large dataset (e.g., 10% of $10^{20}$) is still not practical to generate in man situations.

Therefore, the provisioning manager 128, in one embodiment, is configured to substantially reduce the needed experiment time. For example, the provisioning manager 128 automatically identifies a correlation such as a cost relationship between different requests, e.g., request A and B have similar cost, or the cost of request A is about 2 times higher than that of request B. Such cost relationships allow the provisioning manager 128 to map the original workload vector into a new workload vector with much smaller number of dimensions. This greatly reduces the amount of training data needed to reflex different workload compositions. For the previous example, if the provisioning manager 128 groups 20 different types of requests into 2 general types (e.g., transactional and non-transactional) the number of compositions in the ideal training dataset is effectively reduced from $10^{20}$ to $10^2$.

The following is an illustrative example of efficiently training request-mix aware models. The provisioning manager 128 can utilize various methods for efficiently training request-mix aware models. In a first method, the provisioning manager 128 removes requests with trivial overheads from the performance model. For instance, an HTTP request asking for a small static html file (often cached) from the web server is removed. However, this method may not be able to substantially reduce the dimension of the model input vector as such low-cost requests often contribute to a very limited portion of the overall workloads (e.g., <1%). Therefore, in another method the provisioning manager 128 clusters requests into different groups where requests within the same group have similar overheads. This reduces the dimension of the model input from the number of request types to the number of clusters. Consider a pair of request types A and B. Requests of type A and B both cause the database server to perform the same SELECT operation and the only difference is that the SELECT operation is executed once for A but twice for B. Stated differently, a request of type B is approximately two times more expensive than a request of type A. If A and B are clustered into different groups with fine clustering granularities, the total number of groups can be quite large as only requests with very similar overhead are grouped together. However, if A and B are clustered into the same group, different compositions of type A and B requests may lead to very different workloads due to overhead difference between A and B, even if the total number of requests of this general type may be the same.

The provisioning manager 128 flexibly captures the cost relation between different request types. For example, for requests of the same group, the provisioning manager 128 captures their relative overhead with a linear system. For the previous example, the total workload introduced by requests of type A and B $W_{A,B}=N_A+2N_B$, where N(•) is the request number of a certain type. Formally, the provisioning manager 128 linearly projects the original workload vector $\vec{W}$ defined in a high dimensional space into a new workload vector $\vec{W}^*$ defined in a lower dimensional space.

One difficulty in this projection process is to ensure that the new $\vec{W}^*$ can accurately represent the true workload so that the performance model can provide good prediction. Achieving this goal, however, involves two challenges. The first challenge is to evaluate the quality of a projection π. Although it is possible to apply π to get $\vec{W}^*$ from $\vec{W}$, and compare the prediction accuracy of the performance model trained with $\vec{W}^*$ and that of the model trained with $\vec{W}$, such an approach is also prohibitively expensive given the computation cost of model training. The second challenge is how to efficiently explore and evaluate different projections to find an optimal one. Brute force approaches that explore all possible projections are not practical due to the countless number of possible projections.

Therefore, with respect to evaluating the quality of a projection π, the provisioning manager 128 evaluates the quality of a projection without actually training a performance model based on the projected model input. In this embodiment, mutual information between the projected model input and the corresponding response time as the metric for evaluation, i.e., $I(R,\vec{W}^*)$ where R is the response time and $\vec{W}^*$ is the projected model input. Mutual information of two random variables is a quality that measures the mutual dependence of the two random variables. Formally, the mutual information of two discrete random variables X and Y can be defined as, $$I(X, Y) = \sum_{y \in Y}\sum_{x \in X} p(x, y)\log\left(\frac{p(x, y)}{p(x)p(y)}\right) I(X, Y) = \sum_{y \in Y}\sum_{x \in X} p(x, y)\log\left(\frac{p(x, y)}{p(x)p(y)}\right). \quad (7)$$

Mutual information measures the information that X and Y share: it measures how much knowing one of these variables reduces uncertainty about the other. For example, if X and Y are independent, then knowing X does not give any information about Y and vice versa, so their mutual information is zero. At the other end, if X and Y are identical then all information conveyed by X is shared with Y: knowing X determines the value of Y and vice versa.

Fano's inequality suggests that one can find the optimal projection π by maximizing $I(R,\vec{W}^*)$. This result determines a lower bound to the probability of error when estimating a discrete random variable R from another random variable $\vec{W}^*$ as $$Pr(r \neq \hat{r}) \geq \frac{H(R|\vec{W}^*) - 1}{\log(|R|)} = \frac{H(R) - I(R, \vec{W}^*) - 1}{\log(|R|)}. \quad (8)$$

Hence, when the mutual information between R and $\vec{W}^*$ is maximized, the lower bound on error probability is minimized. Therefore, mutual information serves as a good indicator for the quality of projection, because the higher the mutual information is, the higher predictability of the model built based on the projected model input is.

With respect to efficiently exploring and evaluating different projections to fine an optimal projection, since $I(R,\vec{W}^*)$ is used to measure the quality of a projection and the ideal projection is the one that maximizes $I(R,\vec{W}^*)$, the search for an ideal projection can be formulated as optimization problem defined as follows, $$\pi = \underset{\pi}{\mathrm{argmax}}\, I(R, \vec{W}^*(\pi)) \quad (9)$$

where $\vec{W}^*(\pi)$ is the resulting model input generated by using projection $\pi$. As a result, the provisioning manger 128 can perform gradient ascent on I to find the optimal projection as follows, $$\pi_{t+1} = \pi_t + \eta \frac{\partial I}{\partial \pi} = \pi_t + \eta \sum_{i=1}^{N} \frac{\partial I}{\partial w_i} \frac{\partial w_i}{\partial \pi}, \quad (10)$$

where $I(R, \vec{W}^*)$ can be written as, $$I\left(R, \vec{W}^*\right) = \sum_{r \in R} \int_{w^*} p(r, w^*) \log \frac{p(r, w^*)}{p(r) p(w^*)} dw^*. \quad (11)$$

The provisioning manager 128 uses the data collected on the base deployment to perform the search for the optimal projection. Since the provisioning manager 128 uses workload and performance data collected from the base deployment during the actual application runtime there is no additional cost in generating training data for the searching of the optimal projection. In addition, as the cost relationship between different types of requests is independent of deployments, the provisioning manager 128 applies the learned $\pi$ to the training process of the reference model.

To determine the number of dimensions in the projected workload vector $\vec{W}^*$, the user can choose the acceptable time length of automatic experiments and then use this information to derive the dimensions of $\vec{W}^*$. For instance, suppose a user specifies that the experiment of each deployment should not exceed 30 minutes. If the performance measurement of a given workload can be done in 30 seconds the total number of workload compositions that can be tested on one deployment is 60 (60×½=30). If a 10% random sampling of workload composition is good enough for model training and there are 5 different levels for the request rate, there is a total population of 600 (60/0.1=600) workload compositions which approximately corresponds to a dimension of 4 in $\vec{W}^*$ ($5^4$=625≈600). Note that the user can also specify a high level cost requirement for model building, e.g., the maximum time for experiment or even the total monetary cost for experiment. Therefore, the dimension of $\vec{W}^*$ can be derived based on the above process, the number of deployments needed to test for collecting data and the virtual instance pricing policy.

With the prediction process discussed above, the provision plan selector 210 of the provision manager 128 is able to identify and select the optimal provisioning plan for an application. The provision plan selector 210 explores all candidate provisioning plans and estimates the cost (monetary cost such as virtual machine renting fee which can be easily computed based on the pricing policy of a cloud platform) and performance (obtained by the prediction method discussed above) of each candidate plan. The optimal plan is the one with the lowest cost and performance that satisfies the performance goal. As the cost estimation and performance prediction introduces trivial computational cost, the overall search process can often be completed within a few seconds. In addition, the performance (prediction model, once trained) can be repeated used for different planning tasks with different performance goals.

Operational Flow Diagrams

Figure 5:
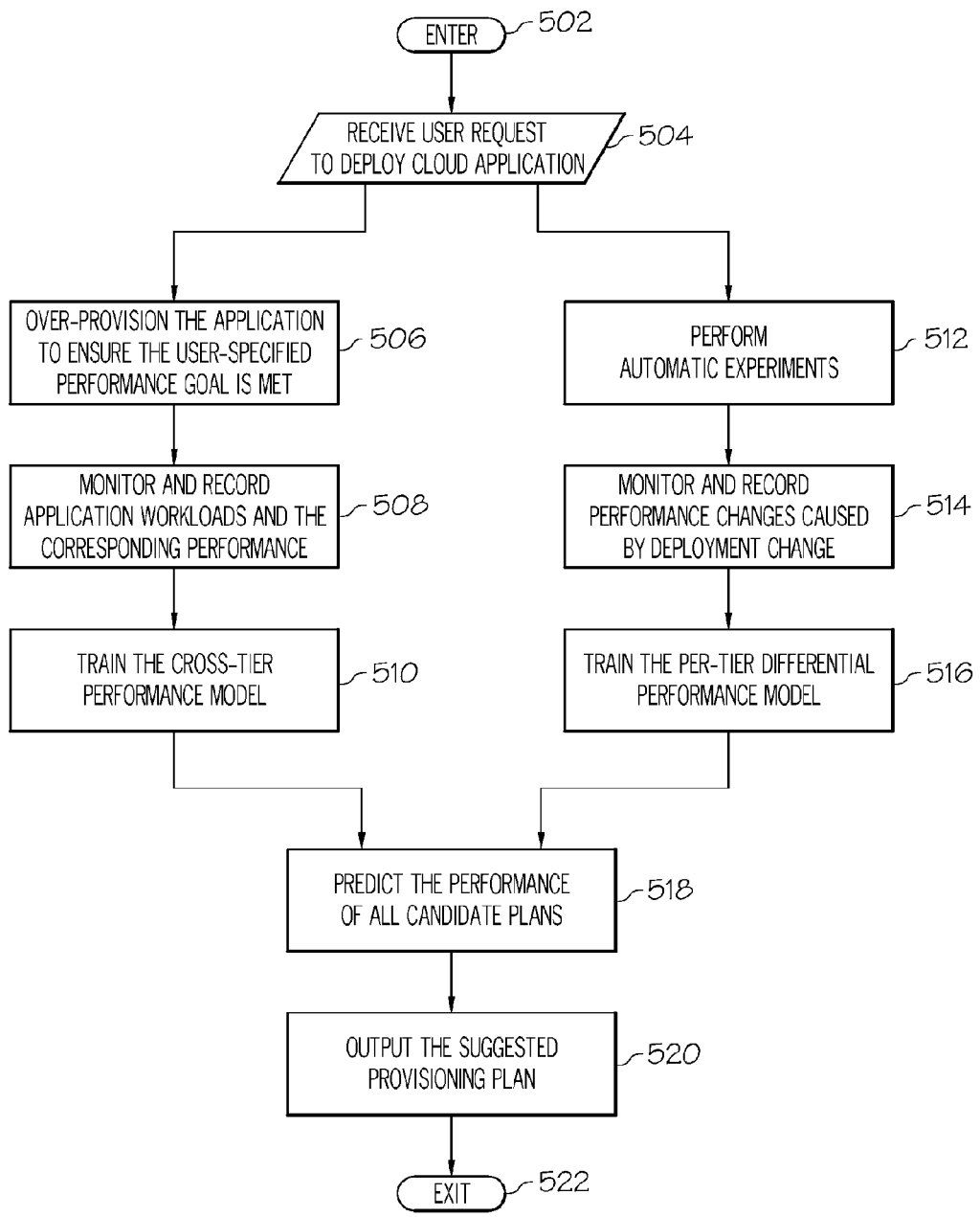
FIG. 5 is an operational flow diagram illustrating one example of an overall process for performing prediction-based provisioning planning in a cloud computing environment according to one embodiment of the present invention.
Figure 6:
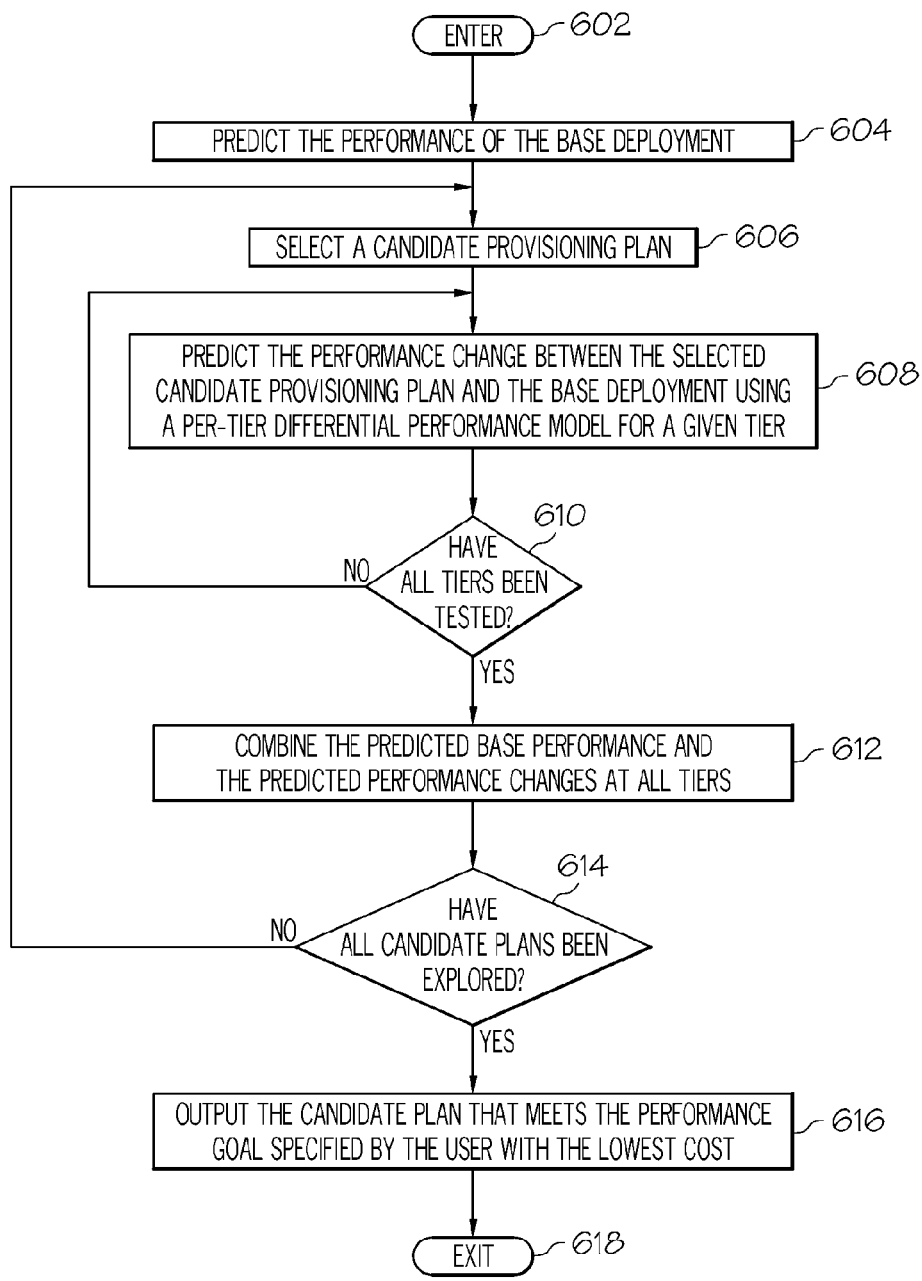
FIG. 6 is an operational flow diagram illustrating one example of a process for predicting the performance of candidate provisioning plans according to one embodiment of the present invention.
Figure 7:
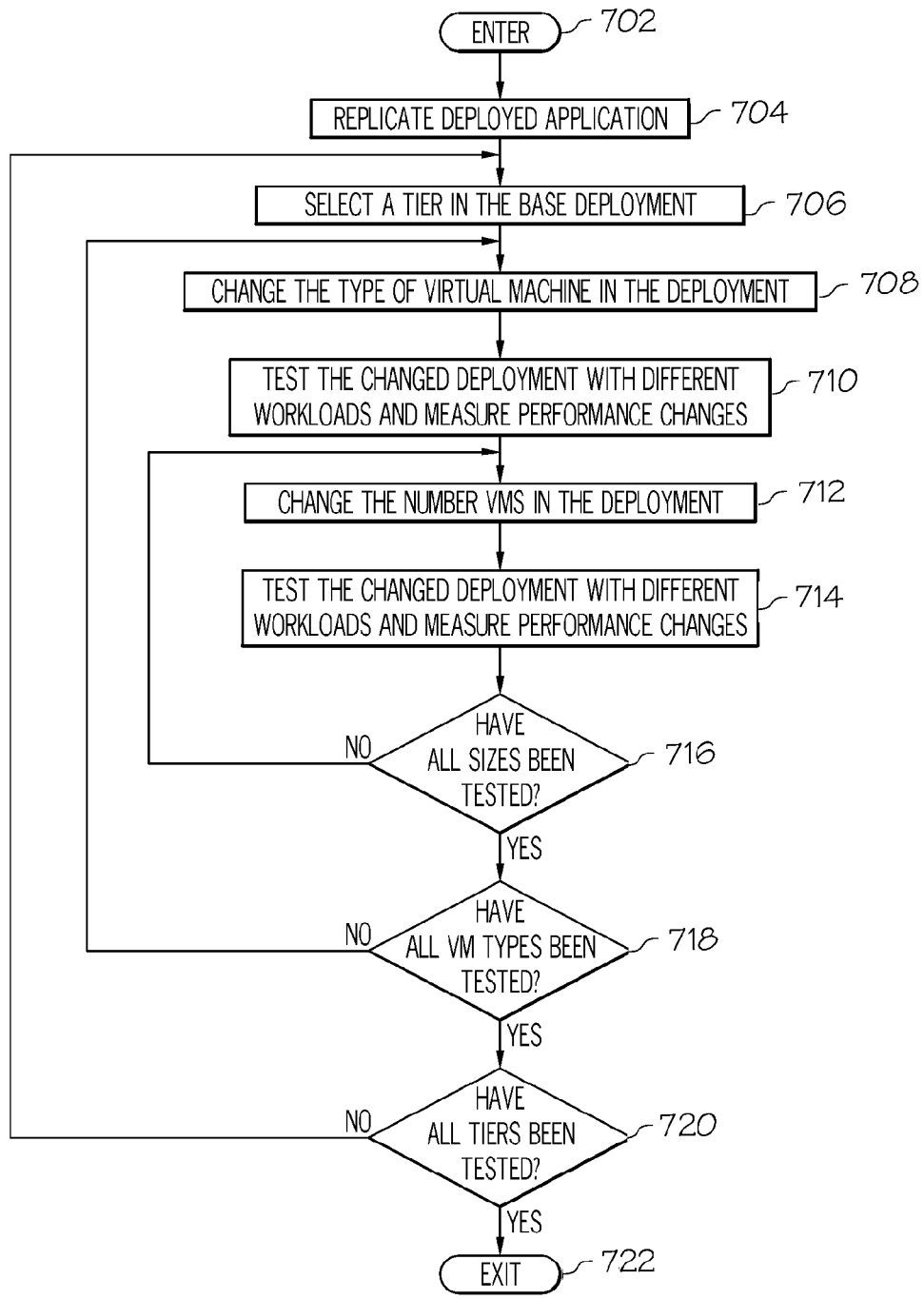
FIG. 7 is an operational flow diagram illustrating one example of a process for performing automatic provisioning experiments on a currently deployed cloud application according to one embodiment of the present invention.

FIGS. 5-7 illustrate operational flow diagrams for various embodiments of the present invention. The methods depicted in FIGS. 5-7 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the embodiments. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

FIG. 5 is an operational flow diagram illustrating one example of an overall process for performing prediction-based provisioning planning in a cloud computing environment. The operational flow diagram of FIG. 5 begins at step 502 and flows directly to step 504. The provision manager 128, at step 504, receives a user's request to deploy a multi-tier cloud application in the cloud computing environment 104. This request includes a specification of the application to be deployed, the expected workload range, and the expected performance. The provision manager 128, at step 506, deploys the application in an over-provisioned setting. While the application is running in the cloud infrastructure, the provision manager 128, at step 508, monitors the workloads and performance of the application, and stores the corresponding monitoring data.

The provision manager 128, at step 510, trains a cross-tier performance model 212 based on the collected workloads and performance data. The provision manager 128, at step 512, replicates the application and performs one or more automatic experiments to learn the performance characteristics of different deployment options. The provision manager 128, at step 514, monitors and records the performance changes caused by the deployment changes. The provision manager 128, at step 516, trains per-tier performance model 214 based on the workloads and performance data collected in the automatic experiments. The provision manager 128, at step 518, predicts the performance of all candidate plans. The provision manager 128, at step 520, identifies and selects a candidate provisioning plan that meets the user specified performance goal and has the lowest virtual machine instance renting cost. The control flow then exits at step 522.

FIG. 6 is an operational flow diagram illustrating one example of a process for predicting the performance of candidate plans. The operational flow diagram of FIG. 6 begins at step 602 and flows directly to step 604. The provisioning manager 128, at step 604, uses the cross-tier model 212 to predict the base deployment performance. The provisioning manager 128, at step 606, selects a candidate provisioning plan. The provisioning manager 128, at step 608, uses the per-tier differential performance model 214 to predict the performance change at a given tier. The provisioning manager 128, at step 610, determines if all tiers have been tested. If the result of this determination is negative, the control flow returns to step 6008 and the prediction if performed for a new tier. If the result of this determination is positive, the provisioning manager, at step 612, combines the predicted base deployment performance and the predicted performance changes at all tiers. The provisioning manager 128, at step 614, determines if all candidate plans have been explored. If the result of this determination is negative, the control flow returns to step 606. If the result of this determination is positive, the provisioning manager 128, at step 616, outputs the candidate plan that meets the performance goal specified by the user with the lowest cost. The control flow exits at step 618.

FIG. 7 is an operational flow diagram illustrating one example of a process for performing automatic provisioning experiments on a currently deployed cloud application. The operational flow diagram of FIG. 7 begins at step 702 and flows directly to step 704. The provisioning manager 128, at step 704, replicates the deployed application. The provisioning manager 128, at step 706, selects a tier of the deployment. The provisioning manager 128, at step 708, changes the type of VM within the current tier. The provisioning manager 128, at step 710, tests the changed deployment with different workloads and measures the performance changes.

The provisioning manager 128, at step 712, changes the number of VMs within the current tier. The provisioning manager 128, at step 714, tests the changed deployment with different workloads and measures the performance changes. The provisioning manager 128, at step 716, determines if all sizes of VMs (all number of VMs) have been tested. If the result of this determination is negative, the control flow returns to step 712. If the result of this determination is positive, the provisioning manager 128, at step 718, determines of all VM types have been tested. If the result of this determination is negative, the control flow returns to step 708. If the result of this determination is positive, the provisioning manager 128, at step 720, determines if all tiers within the deployment have been tested. If the result of this determination is negative, the control flow returns to step 704. If the result of this determination is positive, the control flow exits at step 722.

Cloud Computing

It should be understood that although the following includes a detailed discussion on cloud computing, implementation of the teachings recited herein are not limited to a cloud computing environment. Rather, embodiments of the present invention are capable of being implemented in conjunction with any other type of computing environment now known or later developed, including client-server and peer-to-peer computing environments. For example, various embodiments of the present invention are applicable to any computing environment with a virtualized infrastructure or any other type of computing environment.

For convenience, this discussion includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

With on-demand self-service a cloud consumer can unilaterally provision computing capabilities, such as server time and network storage, as needed automatically without requiring human interaction with a service provider. With broad network access capabilities are available over a network and accessed through standard mechanisms that promote use by heterogeneous thin or thick client platforms (e.g., mobile phones, laptops, and personal digital assistants (PDAs)). With resource pooling computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

With rapid elasticity capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. With measured service cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure comprising a network of interconnected nodes.

Figure 8:
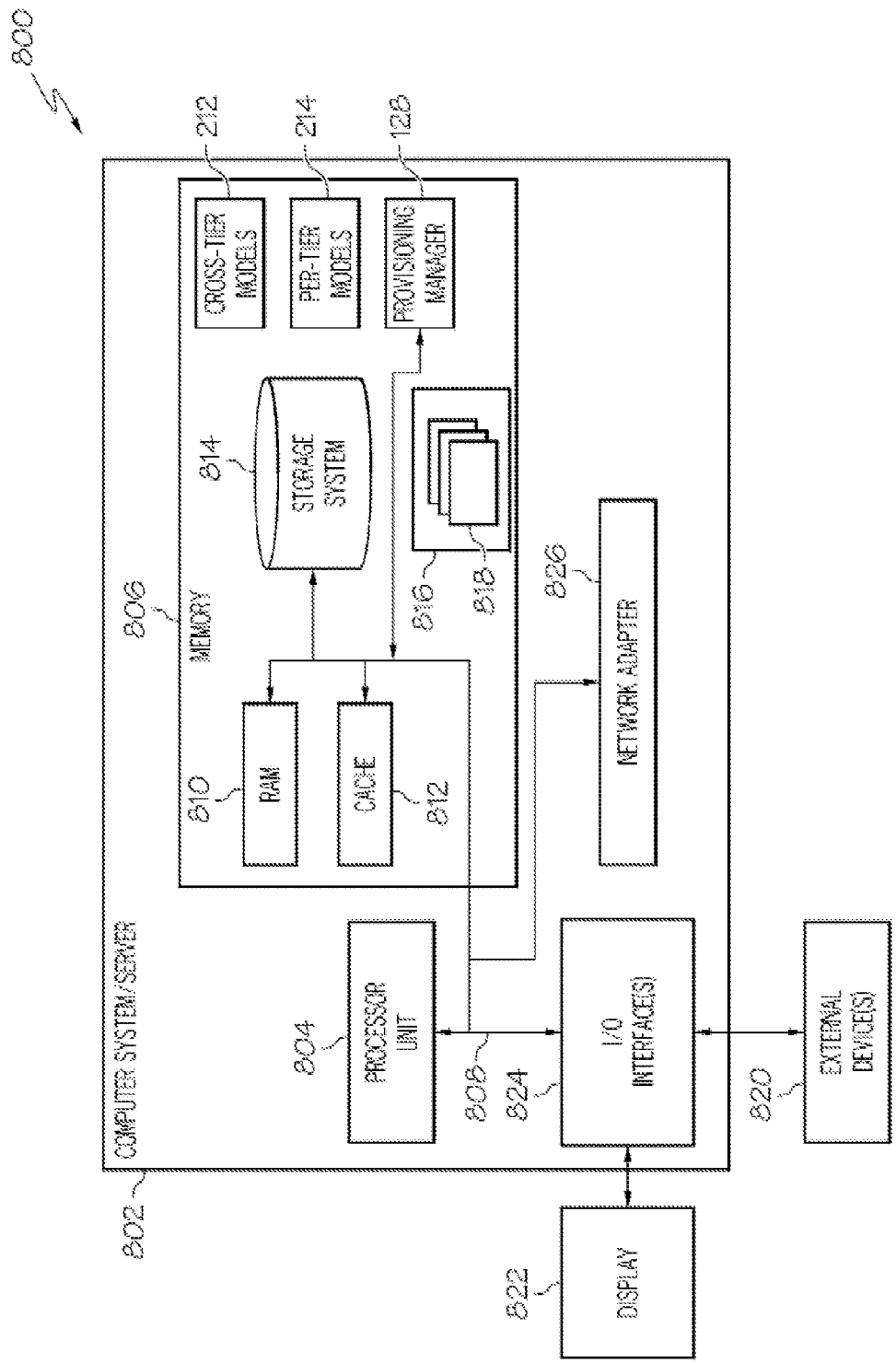
FIG. 8 illustrates one example of a cloud computing node according to one embodiment of the present invention.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 1002, and it includes both volatile and non-volatile media, removable and non-removable media.

System memory 806, in one embodiment, comprises the provisioning manager 128, the cross-tier models 212, and the per-tier models 214 discussed above. The provisioning manager 128 can also be implemented in hardware as well. The system memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of various embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the invention as described herein.

Computer system/server 802 may also communicate with one or more external devices 1020 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 1002 can communicate with one or more networks such as a local area network (LAN), a general wide area network (WAN), and/or a public network (e.g., the Internet) via network adapter 826. As depicted, network adapter 826 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Figure 9:
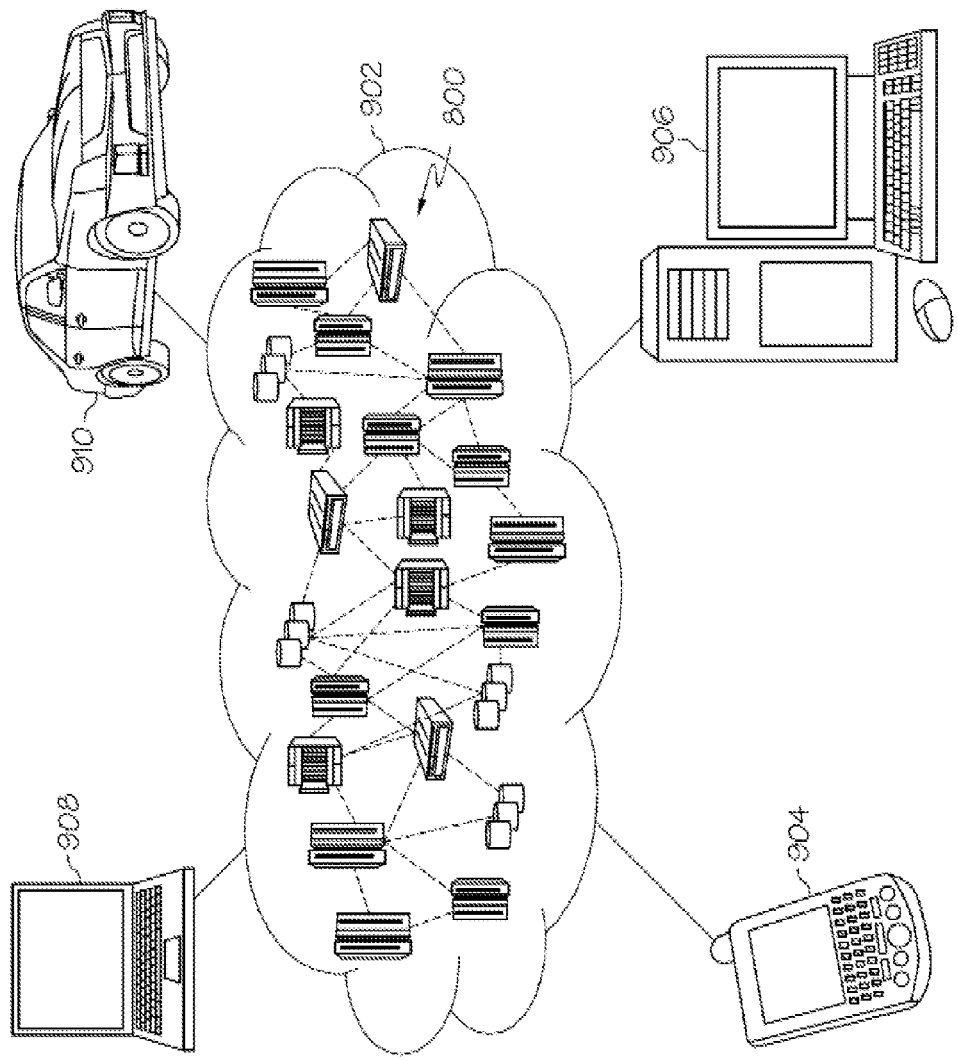
FIG. 9 illustrates one example of a cloud computing environment according to one example of the present invention.

Referring now to FIG. 9, illustrative cloud computing environment 902 is depicted. As shown, cloud computing environment 902 comprises one or more cloud computing nodes 800 with which local computing devices used by cloud consumers, such as, for example, personal digital assistant (PDA) or cellular telephone 904, desktop computer 906, laptop computer 908, and/or automobile computer system 910 may communicate. Nodes 800 may communicate with one another. They may be grouped (not shown) physically or virtually, in one or more networks, such as Private, Community, Public, or Hybrid clouds as described hereinabove, or a combination thereof. This allows cloud computing environment 902 to offer infrastructure, platforms and/or software as services for which a cloud consumer does not need to maintain resources on a local computing device. It is understood that the types of computing devices 904, 906, 908, 910 shown in FIG. 9 are intended to be illustrative only and that computing nodes 800 and cloud computing environment 902 can communicate with any type of computerized device over any type of network and/or network addressable connection (e.g., using a web browser).

Figure 10:
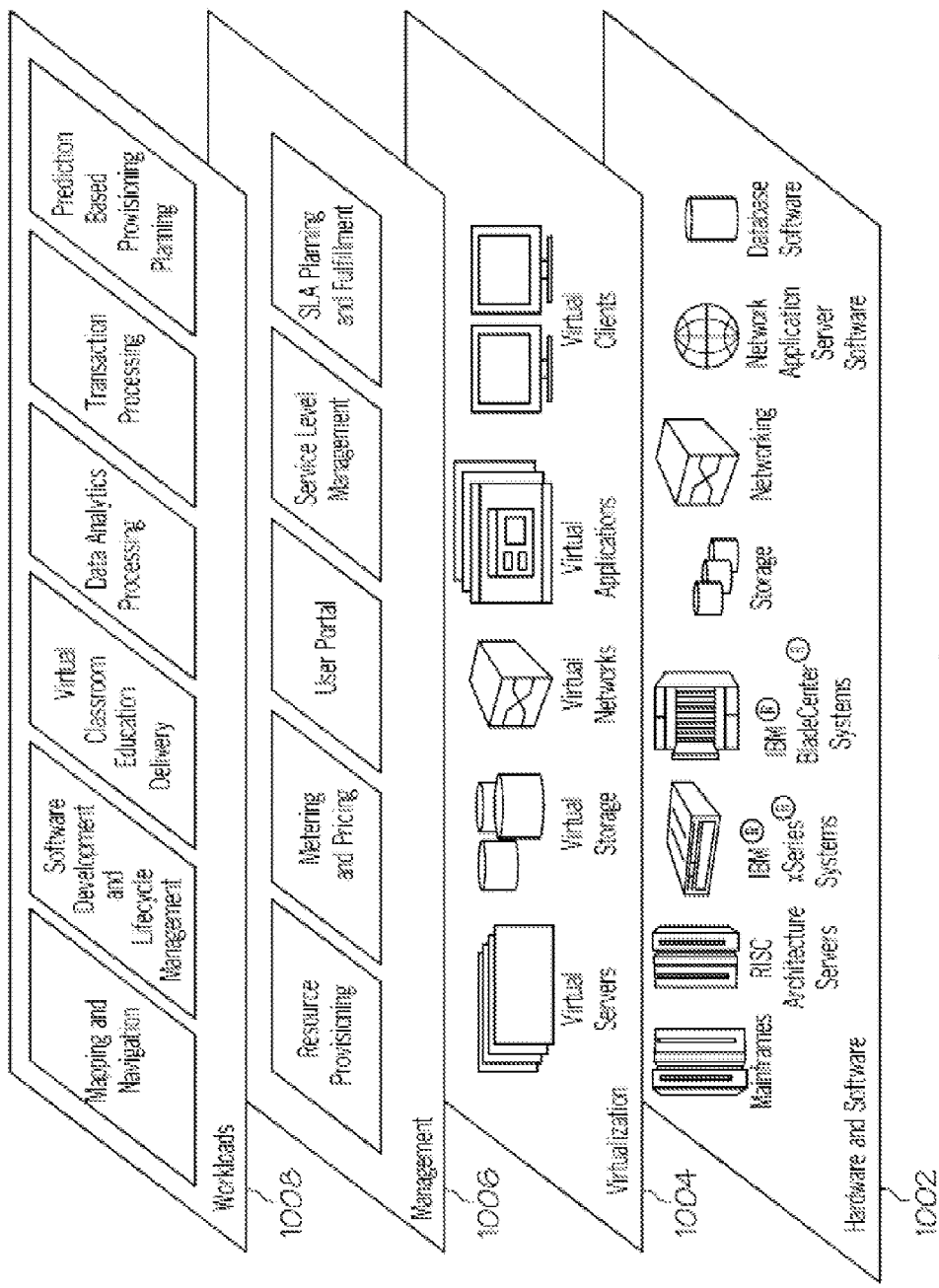
FIG. 10 illustrates abstraction model layers according to one example of the present invention.

Referring now to FIG. 10, a set of functional abstraction layers provided by cloud computing environment 902 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1002 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1004 provides an abstraction layer from which the following examples of virtual entities may be provided: virtual servers; virtual storage; virtual networks, including virtual private networks; virtual applications and operating systems; and virtual clients.

In one example, management layer 1006 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1008 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composable software bundle and virtual image asset design and creation.

NON-LIMITING EXAMPLES

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with an information processing system, for predicting performance of a system comprising a plurality of server tiers, the method comprising:

collecting, for a base allocation of computing resources across multiple server tiers in the plurality of server tiers, a first set of performance information associated with the multiple server tiers for a set of workloads, wherein the collecting comprises applying varying workloads from the set of workloads to the base allocation, wherein the first set of performance information comprises performance information for each of the varying workloads;

generating, on a tier-by-tier basis, a set of experimental allocations of the computing resources, wherein each of the set of experimental allocations varies the computing resources allocated by the base allocation for a single server tier of the multiple server tiers;

collecting, for each of the set of experimental allocations, a second set of performance information associated with the single server tier for a plurality of workloads; and predicting at least one performance characteristic of one or more candidate allocations of computing resources across the multiple server tiers for a given workload based on the first set of performance information and the second set of performance information.

2. The method of claim 1, further comprising:

constructing a cross-tier performance model associated with the multiple server tiers based on the first set of performance information, wherein the cross-tier performance model predicts at least one performance characteristic of the base allocation for various workloads; and constructing a single-tier performance model for each of the single server tiers associated with the set of experimental allocations, wherein the single-tier performance model captures performance changes between the base allocation and the single server tier for each of the set of experimental allocations associated with the single server tier.

3. The method of claim 2, wherein the performance changes are captured using non-parametric regression.

4. The method of claim 2, wherein predicting the at least one performance characteristic of the one or more candidate allocations comprises:

determining at least one performance characteristic of the base allocation for the given workload based on the cross-tier performance model;

determining, for at least one server tier of the multiple server tiers associated with the candidate allocation, a delta between the performance characteristic of the base allocation and at least one performance characteristic of the server tier for the given workload; and combining the performance characteristic of the base allocation with the delta to obtain the predicted performance characteristic of the candidate allocation.

5. The method of claim 4, further comprising:

predicting a workload at each server tier of the multiple server tiers associated with the candidate allocation;

identifying an actual workload from the given workload at each tier; and replacing the given workload with the actual workload that has been identified.

6. The method of claim 5, wherein predicting the workload at each server tier is based on at least one of actual workloads received by each server tier and workloads observed at each server tier.

7. The method of claim 1, further comprising:

measuring performance data associated with the multiple server tiers for plurality of different workload types;

determining a set of correlations among the performance data across the different workload types; and reducing, based on the set of correlations, a number of workloads required to collect at least one of the first performance information and the second performance information.

8. The method of claim 7, wherein the set of correlations are captured using non-parametric regression.

9. The method of claim 1, further comprising:
identifying, based on the predicting, a candidate allocation from the one or more candidate allocations that comprises a predicted performance characteristic that satisfies a performance goal specified by a user, and that is associated with a lowest monetary cost; and
notifying the user of the identified candidate allocation.

10. The method of claim 1, wherein the multiple server tiers comprise a web server tier, an application server tier, and a database server tier.

11. The method of claim 1, wherein the predicted performance characteristic is at least one of an average response time associated with a workload and a request throughput rate.

12. The method of claim 1, wherein computing resources are varied within each of the set of experimental allocations by varying at least one of a number of virtual machines and a type of virtual machines allocated for the single server tier.

13. The method of claim 1, further comprising:
determining a cost relationship between different types of requests within a least one of the set of workloads and the plurality of workloads based on mutual information between a set of performance associated with one or more server tiers of the multiple server tiers and one or more workloads; and
constructing groups of request types from requests within the one or more workloads based on the cost relationship between different types of requests, wherein a cost of requests in a same group is defined in a same linear space.

14. The method of claim 1, further comprising:
reducing a complexity of a performance prediction model used to predict the at least one performance characteristic based on combining multiple request types within one or more workloads into a given number of request groups, wherein the given number of request groups reduce at least one dimension of a workload vector used as an input to the performance prediction model, and
wherein the given number of request groups is determined by performing gradient ascent on mutual information between a set of performance associated with one or more server tiers of the multiple server tiers and one or more workloads.

15. A method, with an information processing system, for predicting performance of a system comprising a plurality of server tiers, the method comprising:
collecting, for a base allocation of computing resources across multiple server tiers in the plurality of server tiers, a first set of performance information associated with the multiple server tiers for a set of workloads;
generating, on a tier-by-tier basis, a set of experimental allocations of the computing resources, wherein each of the set of experimental allocations varies the computing resources allocated by the base allocation for a single server tier of the multiple server tiers;
collecting, for each of the set of experimental allocations, a second set of performance information associated with the single server tier for a plurality of workloads;
constructing a cross-tier performance model associated with the multiple server tiers based on the first set of performance information, wherein the cross-tier performance model predicts at least one performance characteristic of the base allocation for various workloads;
constructing a single-tier performance model for each of the single server tiers associated with the set of experimental allocations, wherein the single-tier performance model captures performance changes between the base allocation and the single server tier for each of the set of experimental allocations associated with the single server tier; and
predicting at least one performance characteristic of one or more candidate allocations of computing resources across the multiple server tiers for a given workload based on the first set of performance information and the second set of performance information.

16. The method of claim 15, wherein the performance changes are captured using non-parametric regression.

17. The method of claim 15, wherein predicting the at least one performance characteristic of the one or more candidate allocations comprises:
determining at least one performance characteristic of the base allocation for the given workload based on the cross-tier performance model;
determining, for at least one server tier of the multiple server tiers associated with the candidate allocation, a delta between the performance characteristic of the base allocation and at least one performance characteristic of the server tier for the given workload; and
combining the performance characteristic of the base allocation with the delta to obtain the predicted performance characteristic of the candidate allocation.

18. The method of claim 15, further comprising:
predicting a workload at each server tier of the multiple server tiers associated with the candidate allocation;
identifying an actual workload from the given workload at each tier; and
replacing the given workload with the actual workload that has been identified.

19. The method of claim 15, further comprising:
measuring performance data associated with the multiple server tiers for plurality of different workload types;
determining a set of correlations among the performance data across the different workload types; and
reducing, based on the set of correlations, a number of workloads required to collect at least one of the first performance information and the second performance information.

20. The method of claim 15, further comprising:
identifying, based on the predicting, a candidate allocation from the one or more candidate allocations that comprises a predicted performance characteristic that satisfies a performance goal specified by a user, and that is associated with a lowest monetary cost; and
notifying the user of the identified candidate allocation.

* * * * *